United States Patent [19]
Belke

[11] 3,965,709
[45] June 29, 1976

[54] BICYCLE LOCK

[75] Inventor: Carl F. Belke, Scottsdale, Ariz.

[73] Assignee: David P. Belke, Tucson, Ariz. ; a part interest

[22] Filed: June 4, 1975

[21] Appl. No.: 583,585

[52] U.S. Cl................................. 70/227; 70/234
[51] Int. Cl.².................... B62H 5/16; E05B 71/00
[58] Field of Search .............. 70/40, 227, 233, 234; 292/148

[56] References Cited
UNITED STATES PATENTS

| 596,237 | 12/1897 | Damon | 70/18 |
|---|---|---|---|
| 805,207 | 11/1905 | Kaiser | 70/227 |
| 2,140,489 | 12/1938 | Wise | 70/227 |
| 3,752,518 | 8/1973 | Cannell | 292/42 |

FOREIGN PATENTS OR APPLICATIONS

| 38,199 | 11/1927 | Denmark | 70/227 |
|---|---|---|---|
| 450,199 | 7/1936 | United Kingdom | 70/233 |

Primary Examiner—Albert G. Craig, Jr.
Attorney, Agent, or Firm—John A. Robertson

[57] ABSTRACT

A bicycle lock comprising three units, namely, a ring assembly, a wire cable and a padlock. The ring assembly includes an arcuate tubular ring having a gap therein. A solid metallic rod is slidable in the ring and has a gap therein. The ring is formed on its outer contour with a slot that is closed at both ends. A stem passes through this slot and its inner end is secured to the rod which is moveable into positions either opening or closing the gap in the ring. The ring is formed with two passages either of which is adapted to receive the hasp of the padlock. A transverse bracket on the ring is attached to the frame of a bicycle wheel. The wire cable is formed with a loop at each end. One loop is permanently attached to the ring and the other loop receives a portion of the solid rod when the latter closes the gap in the ring. In unlocked position the latter loop receives the hasp of the padlock which is passed through one of said passages.

6 Claims, 9 Drawing Figures

BICYCLE LOCK

The present invention relates to bicycle locks and is concerned primarily with a lock which not only may be applied to the wheel of a bicycle to prevent rotation thereof, but also includes a metallic line such as a wire cable or chain which may be wrapped about a permanent fixture such as a post with its end secured by the locking apparatus to prevent removal of the bicycle as an entirety.

BACKGROUND OF THE INVENTION

At the present time the use of bicycles is becoming more and more widespread which condition may be attributed largely to the energy crisis. Due to this extensive use of bicycles, the theft thereof presents an ever increasing problem. The known art is replete with examples of locks intended to prevent such theft. These known devices may be generally categorized in two classes. One such class is characterized as including apparatus which prevents rotation of a wheel of the bicycle by including a member which passes through the spokes of the wheel and is locked in this position. The other category of locks is typified by the inclusion of a metallic line such as a wire cable or chain of sufficient length to permit it being wrapped about a permanent fixture and its ends being anchored to the bicycle by a locking device.

The first class of locks above identified includes examples of an arcuate tubular ring like member having an extent less than 360° which provides a gap through which the rim and tire of a bicycle wheel may be passed. A solid arcuate rod is slideable in the bore of this tubular ring and is provided with manually operable means for causing this sliding action. When the rod is moved into position closing the gap in the ring it is locked in this position, however, in the known devices of this general character, the rod is held in open position by a spring and there is no provision for locking this open position. Moreover, the known devices of this character make no provision for securing the ends of a metallic line thereto. It is believed to be highly desirable to provide a bicycle lock of this so called ring type which may be locked in open position with the line being wrapped around an element of the bicycle frame and its ends secured.

At the present time a large proportion of the bicycles now meeting with public acceptance include brakes which are applied to the tire of the wheel and which are controlled by operating members mounted on the handlebars of the bicycle. However, the old style conventional coaster brake bicycle is also now meeting with appreciable use. It is highly important that a bicycle lock be adapted for use with either of those types of bicycles and also adapted for application to either or both of the front or rear wheels. It is also believed to be highly desirable that the lock be susceptible of being literally built into the bicycle by the manufacturer thereof, or manufactured as an accessory which can be applied to bicycles on which they have not been included.

OBJECTS OF THE INVENTION

With the foregoing conditions in mind the present invention has in view the following objectives:

1. To provide a bicycle lock which when applied to a bicycle wheel will prevent rotation of the wheel and which also inhibits physical removal of the bicycle as an entirety.

2. To provide, in a bicycle lock of the type noted, which may be mounted on the frame of a bicycle above either the front or rear wheel thereof.

3. To provide, in a bicycle lock of the character aforesaid, which is adapted for installation on both types of bicycles now in common use, that is to bicycles including brake controls on the handlebars or conventional coaster brakes.

4. To provide, in a bicycle lock of the kind described, which includes as a characteristic and essential element a broken or interrupted tubular ring presenting a gap through which the tire and rim of a bicycle wheel may be passed together with an arcuate rod that is slideable in said ring and which presents a gap which is adapted to align with the gap in the ring and which may be slid into position closing the gap in the ring.

5. To provide, in a bicycle lock of the character aforesaid, a transverse bracket which has its ends permanently secured to the ring and which divides the ring into open and closed sections, the open section including the gap.

6. To provide, in a bicycle lock of the kind described, a metallic line having a loop at each end with one loop receiving the closed section of the ring and the other loop being adapted to receive either side of the open section or the metallic rod.

7. To provide, in a bicycle lock of the type noted, mechanism for locking the rod in a position in which the gap of the ring is open and both ends of the line are secured.

8. To provide, in a bicycle lock of the character aforesaid, which includes a conventional padlock as an essential element.

Various other more detailed objects and advantages of the invention, such as arise in connection with carrying out the above ideas in a practical embodiment, will, in part, become apparent and, in part, be hereinafter stated as the description of the invention proceeds.

SUMMARY OF THE INVENTION

The foregoing objectives are achieved by providing locking apparatus which while it is particularly designed for installation on a bicycle, is also susceptible of application to other cycles such as motorcycles and tricycles. The lock apparatus includes as a characteristic and essential element an interrupted tubular ring presenting a gap of sufficient extent to permit the passage of the rim and tire of a wheel therethrough. Slideable in the bore of this ring is an arcuate rod which also has a gap therein the extent of which is slightly in excess of the gap in the ring. The ring is formed with a slot which is located on the radial outermost portion of the ring adjacent to one side of the gap therein. This slot has an arcuate extent substantially equal to the gap in the rod as defined by the closed ends.

A stem, preferably a screw stem, passes through this slot and has its inner end anchored to the rod. The other end of the stem which projects beyond the ring is provided with an operating member in the form of a tab. It is evident that this tab may be availed of to swing the rod into or out of position closing the gap in the ring.

Formed in that portion of the ring between one side of the gap therein and the end of the slot adjacent thereto, are a pair of aligned apertures which define a passage through which the hasp of a padlock may be passed and when so positioned, this hasp constitutes an abutment for the end of the rod which prevents sliding movement thereof in a direction which would close the gap in the ring.

Formed in the ring at an area spaced from the other side of the gap a distance substantially equal to the extent of the gap in the rod is a second pair of aligned apertures which are adapted to receive the hasp of a padlock. When so positioned, the hasp constitutes an abutment for the other end of the rod which inhibits movement of the rod from its position closing the gap in the ring.

A bracket has its ends permanently secured to the ring in a position in which it is generally parallel to the gap therein and dividing the ring into an upper closed section and a lower open section in which the gap is included. This bracket is adapted to be secured to the bicycle frame immediately over the front or rear wheel in a position in which the open section encompasses the rim and tire of the wheel and in which position, the rod may be slid between the spokes of the wheel to prevent rotation thereof.

A metallic line which may be either a wire cable or a chain is of sufficient length to permit it being wrapped around a permanent fixture such as a post and has a loop at each end. One of those loops is permanently received by the closed section of the ring. The other end of the loop is adapted to receive either side of the open section of the ring or the rod when the latter is in position closing the gap in the ring. The loop at this end is also adapted to receive the hasp of a padlock when the latter is applied to the first mentioned pair of aligned openings to secure the rod in position in which the gap therein aligns with the gap in the ring. Before achieving this latter lock condition, the line may be wrapped around that part of the bicycle frame immediately contiguous to the place where the bracket is attached.

The padlock is purely conventional and may be operated by a key or by a tumbler combination, the essential element thereof is the hasp above described.

For a full and more complete understanding of the invention, reference may be had to the following description and accompanying drawings wherein.

DESCRIPTION OF A PREFERRED EMBODIMENT

As mentioned above, while the instant lock is designed primarily for incorporation into or application onto a bicycle, it is equally suitable for use in conjunction with other cycles such as a motorcycle or a tricycle. When built into or installed on a motorcycle the parts would merely be heavier and more massive and the metallic line would probably be a chain. If installed on a tricycle the parts would be somewhat lighter. Also, while this lock is suitable for application to either the front or rear wheel of a bicycle, the rear wheel would be preferable in most cases. This lock is illustrated in FIGS. 2, 7, 8, and 9 and is considered as a preferred embodiment.

Figure 9:
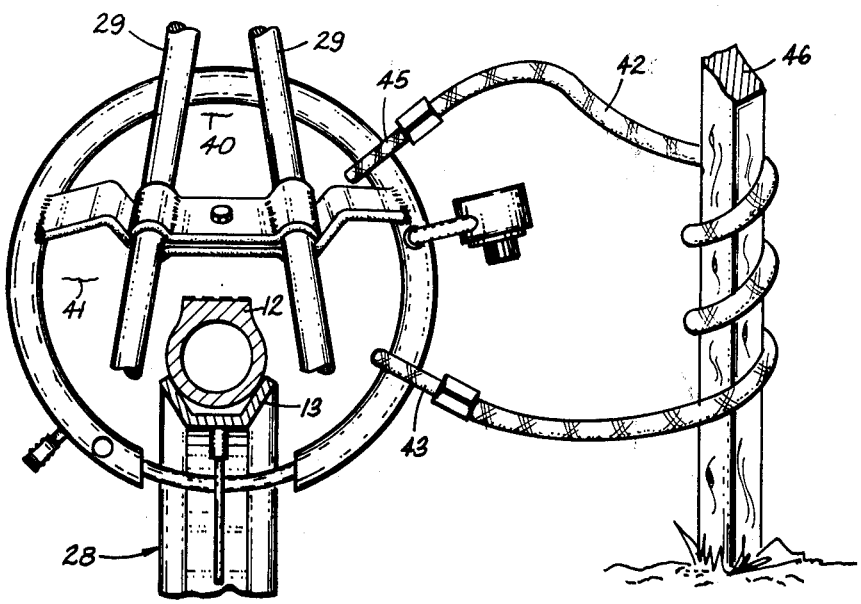
FIG. 9 is an end elevation of the lock of FIG. 2.

Referring to those views, an interrupted tubular metallic ring 10 is shown as presenting a gap 11. Gap 11 should have an extent sufficient to allow for the free passage of a tire 12 and rim 13 of the rear wheel of a bicycle therethrough as illustrated in FIG. 9. Ring 10 is of a strong metal such as steel which will offer a high degree of resistance to a tool such as a bolt cutter. It presents a bore 15 which extends entirely therethrough.

An arcuate rod 16 is dimensioned to slide in bore 15 with a fairly snug fit. It has end faces 17 and 18 which define a gap somewhat greater than gap 11. Formed on the radial outermost portion of ring 10 is a slot 19 having closed ends 20 and 21 which are spaced apart a distance substantially equal to the distance between end faces 17 and 18 of rod 16. A stem 22 is passed through slot 19 and has a lower threaded end which is screwed into a socket (not illustrated) in rod 16 thus stem 22 is anchored to rod 16. Formed on the outer end of stem 22 is a tab 23 which is adapted to be engaged by the fingers of an operator to slide rod 16 in bore 15 an arcuate distance equal to the distance between ends 20 and 21 of the slot. Thus, speaking with reference to the illustrations of the drawings, when rod 16 may be slid in a clockwise direction until stem 22 abuts end 20 of the slot and it may be slid in a counterclockwise direction until stem 22 abuts end 21 of the slot. That portion of the ring 10 between slot end 21 and gap 11 is formed with a pair of aligned apertures 24 which constitute a passage extending entirely through ring 10.

Figure 1:
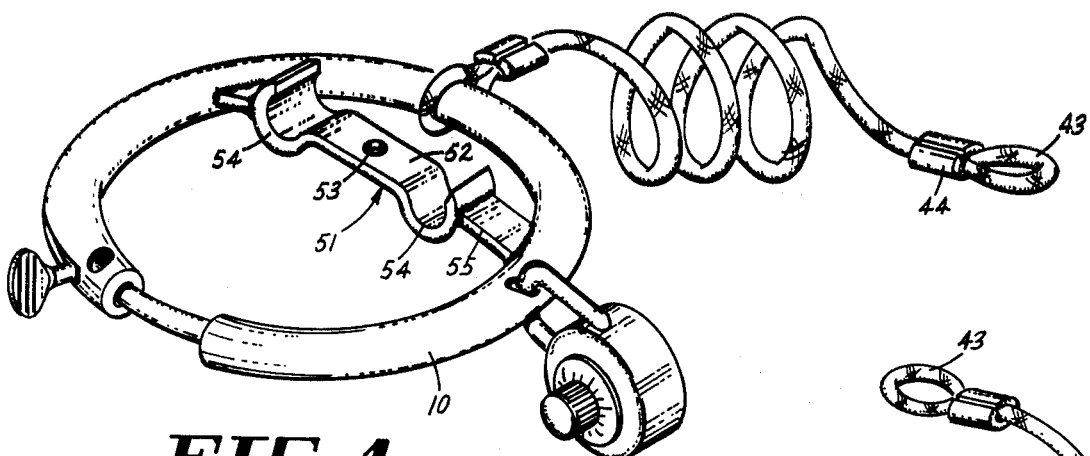
FIG. 1 is a perspective of the bicycle lock of this invention illustrated per se, and illustrating the bracket for application to the bicycle frame over the front wheel.
Figure 5:
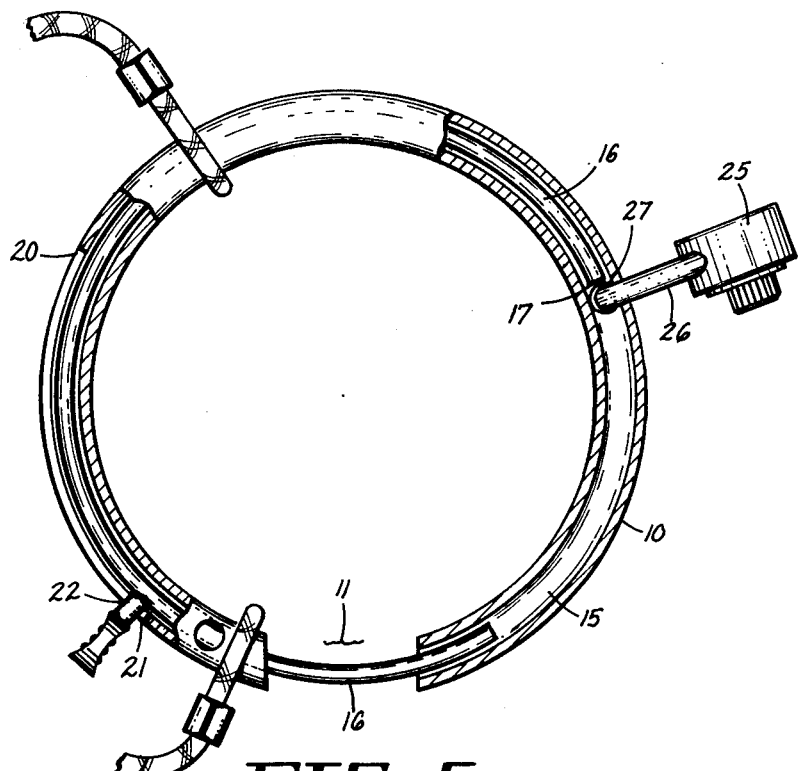
FIG. 5 is a section taken on the plane of line 5—5 of FIG. 4 and illustrating the lock in its closed or locked position.
Figure 8:
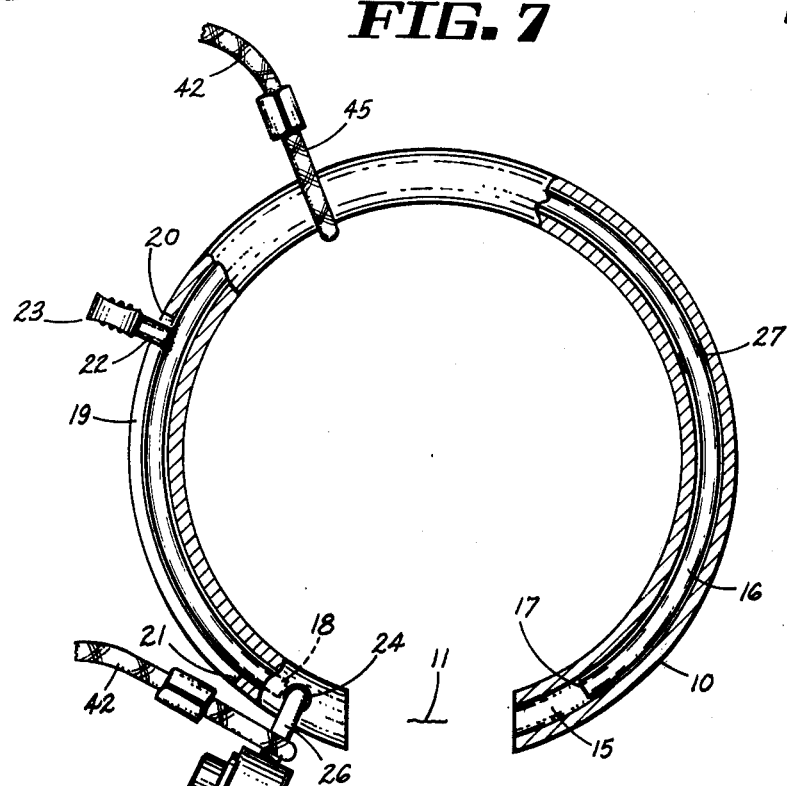
FIG. 8 is a section taken on the plane of line 8—8 of FIG. 7 depicting the lock as secured in open position.

A conventional padlock is indicated at 25 and includes a hasp 26 which when passed through aperture 24 constitutes an abutment for end face 18 of rod 16. When so positioned, as illustrated in FIG. 8, sliding movement of rod 16 in a counterclockwise direction is inhibited. At the same time, stem 22 is in abutting engagement with slot end 20 which prevents sliding movement in a clockwise direction, thus rod 16 is literally fixed in ring 10. This same fixed position obtains in both the embodiments of FIGS. 1 and 2. FIG. 5 illustrates the locked or closed position of both embodiments.

Ring 10 is formed with another pair of aligned apertures 27 which cooperate to define a passage extending entirely through the ring and this passage is located on the side of the ring opposite to that in which apertures 24 are formed and at a distance from gap 11 substantially equal to the extent of slot 19. With rod 16 slid into position closing gap 11, stem 22 engages slot end 21 and end face 17 of rod 16 is located just in advance of apertures 27 speaking with reference to clockwise movement of the rod. Thus with hasp 26 passing through apertures 27 this clockwise movement of rod 16 is prevented and the rod is literally fixed in ring 10.

Figure 2:
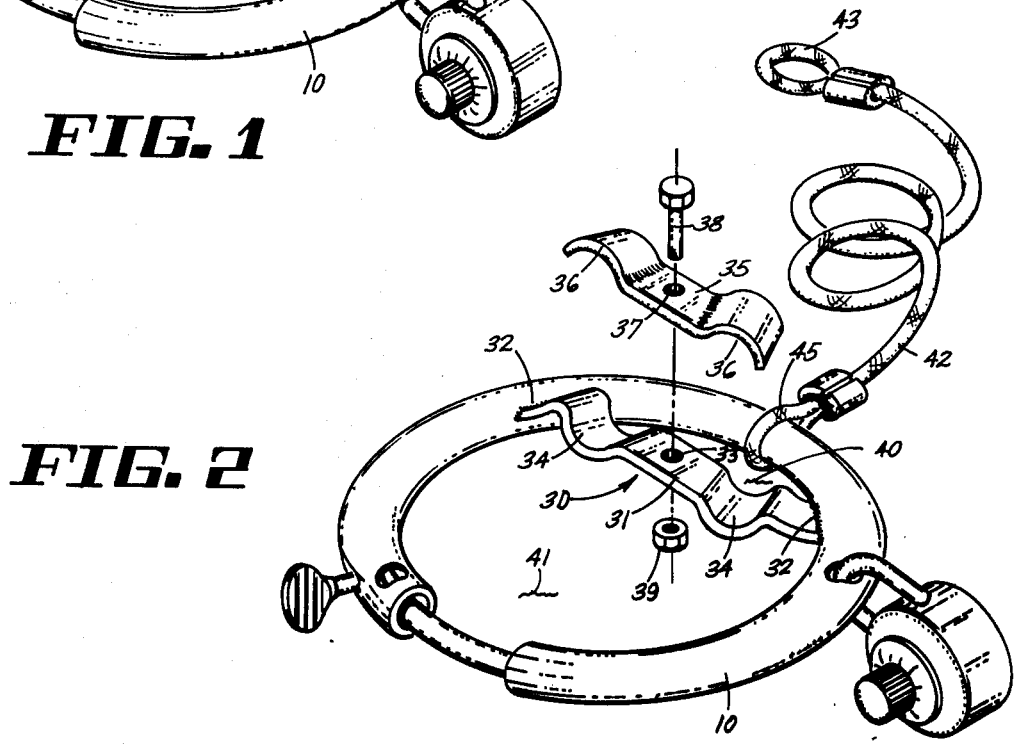
FIG. 2 is another perspective similar to FIG. 1 illustrating th elements of the bracket for attachment to the bicycle frame over the rear wheel in exploded relation.
Figure 3:
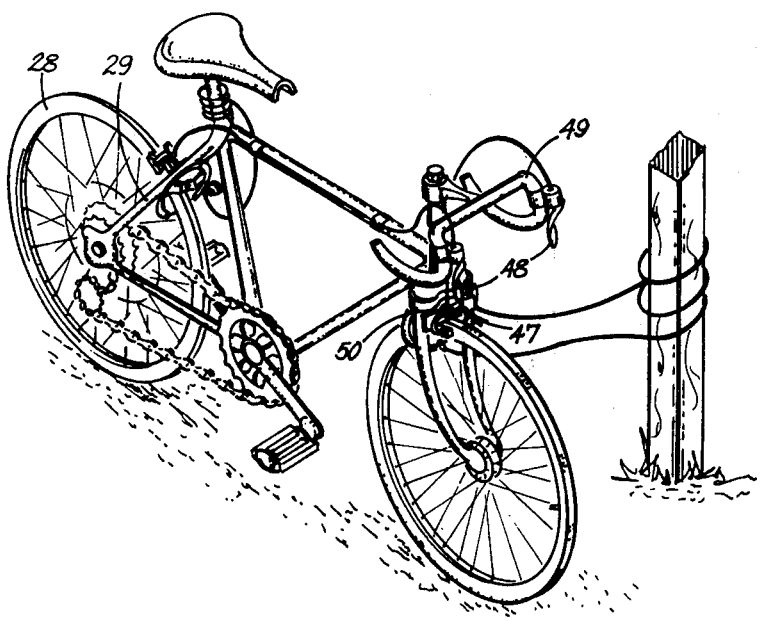
FIG. 3 is a perspective of a bicycle with the subject lock applied to both the front and rear wheels.
Figure 7:
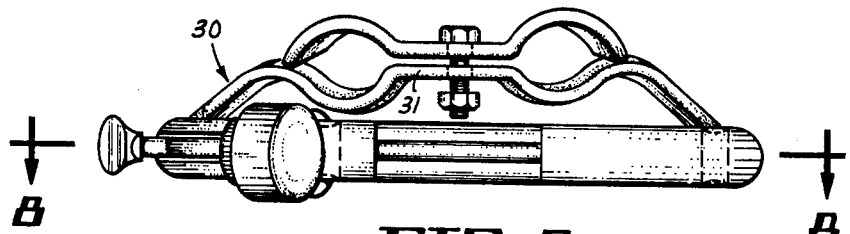
FIG. 7 is a bottom plan view of the lock of FIG. 2 with the cable omitted.

Referring more for the moment to FIG. 3, the rear wheel of a bicycle at 28 and is shown as mounted between a pair of arms 29 which are a part of the bicycle frame. A bracket referred to in its entirety at 30 as illustrated in FIGS. 2 and 7 and is provided for the purpose of mounting the lock on arms 29. Bracket 30 comprises a cross bar 31 having end portions which are permanently secured to ring 10 in any preferred manner such as by the weldings represented at 32. Cross bar 31 is formed with a central opening 33 and at a distance on each side of opening 33 is formed with a concaved portion 34 which is adapted to receive one of the arms 29 above wheel 28 as illustrated in FIG. 9.

Cooperating with cross bar 31 is a tiebar 35 having concaved end portions 36 which are located opposite to concaved portions 34 of cross bar 31. Tiebar 35 has a central aperture 37 which aligns with opening 33 whereupon a bolt 38 may be passed through the aligned openings and a nut 39 screwed thereon to clamp the tiebar 33 to cross bar 31 with the arms 28 secured therebetween.

Bracket 30 is arranged in a position which is believed to be more aptly described as being generally parallel to gap 11 to define an upper closed ring section 40 and an open lower section 41 which is of appreciably greater extent than closed section 40.

A metallic line is illustrated as being in the form of a wire cable 42 having a loop 43 formed at one end thereof by metallic clamp 44 and a second loop 45 formed at the other end and similarly secured. Line 42 will ordinarily have a length in the order of 6 feet. At this point it is well to note that wire cable 42 is intended as merely exemplary of a heavy metallic line which will offer appreciable resistance to being severed such as by a bolt cutter. The line might just as well be a heavy link chain in which event the loops 43 and 45 would be represented by end links which are in fact loops.

loop 45 is permanently anchored to the closed section 40 of ring 10 by receiving this portion of the ring. This connection may be achieved by either inserting ring 10 into loop 45 before cross bar 31 is welded to the ring or by passing the end portions of cable 42 about ring 10 before clamp 44 is applied.

When the bicycle is to be secured to a permanent fixture such as to post represented at 46 in FIG. 9, cable 42 is wrapped about the post and loop 43 is secured to the open section 41 of the ring either by being passed over a side portion of the ring 10 adjacent to gap 11 or by passing rod 16 through the loop as it is slid into position closing the gap. When the rod 16 is to be secured in position in which gap 11 is open, loop 43 is passed over hasp 26 of the padlock before the hasp is applied to apertures 24. Before this connection is achieved cable 42 is wrapped around the seat post of the bicycle. This wrapping in an intermediate stage is illustrated in FIG. 3.

OPERATION OF A PREFERRED EMBODIMENT

While the mode of operation and manner of using the above described bicycle lock are believed to be obvious from the illustrations of the drawings and description of parts set forth above, they are briefly outlined as follows:

It is first noted that the lock if built into the bicycle by the manufacturer, the two part bracket 30 would be eliminated and ring 10 would be mounted on the bicycle frame immediately over rear wheel 28 in close position near the seat post. With tiebar 35 separated from cross bar 31, the two bars are applied about frame arms 29 and clamped together by bolt 38 and nut 39.

Assuming that the rod 16 is in the position of FIG. 8 in which gap 11 is open, and it is desired to establish the locked condition, padlock 25 is unlocked and hasp 26 removed from aperture 24. Loop 43 is then removed from hasp 26, cable 42 is then wrapped around a permanent fixture such as post 46 and loop 43 secured to one side of the open section 41 of ring 10. Tab 23 is then engaged by the operator and rod 16 slid from the position of FIG. 8 into the position of FIG. 5 which closes gap 11. Hasp 26 is then passed through aperture 27 to secure the locked position.

DESCRIPTION OF A SECOND EMBODIMENT

Figure 4:
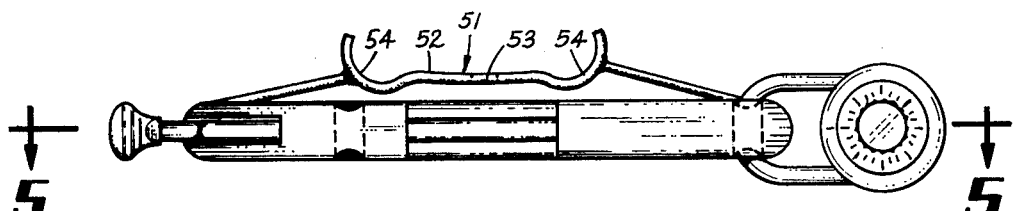
FIG. 4 is a bottom plan view of the lock illustrated in FIG. 1.
Figure 6:
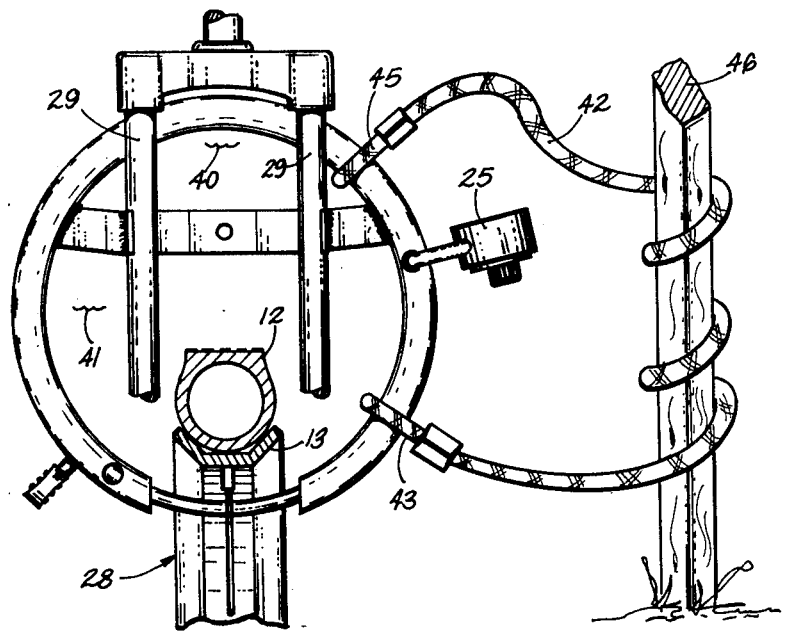
FIG. 6 is an end elevation of the lock of FIG. 1 showing portions of the bicycle wheel in section and illustrating the cable as wrapped about a post.

It is evident that the lock of FIGS. 2, 7, and 9 may be applied to the rear wheel of a bicycle whether of the conventional coaster brake type or one in which wheel brakes are operated by controls mounted on the handlebars. Referring to FIG. 3, a front wheel brake is illustrated somewhat sketchily at 47 and is operated by controls 48 which are mounted on handlebars 49. The details of brake 47 are not particularly important to the present invention other than to note that they include a center bolt 50. The embodiment of FIGS. 1, 4, and 6 include a bracket which is particularly adapted to being anchored to the bicycle frame by this bolt 50. This bracket takes the form of a cross bar designated generally 51 having a center flat portion 52 formed with an opening 53 through which bolt 50 is passed. A nut is then screwed onto the bolt to clamp the cross bar 51 to the frame.

At each end of the center flat portion 52 there is a curved formation 54 which receives a frame arm which supports the front wheel. A strut 55 connects each curved formation 54 to ring 10 by being welded to the elements at each end.

The remaining constructions and mechanisms of the lock of this embodiment is exactly the same as that described above in connection with FIGS. 2, 7, and 9. The mode of operation is also the same with the possible exception of noting that when the lock is secured in the open position cable 42 is wrapped about the handlebar post.

While preferred embodiments of the invention are hereinbefore disclosed it is to be clearly understood that the invention is not limited to the exact constructions, mechanisms, and devices illustrated and described because various modifications may be provided in putting the invention into practice.

What is claimed is:

1. In a bicycle lock for securing a wheel of the bicycle against rotation and preventing physical removal of the bicycle as an entirety,
    a. an interrupted tubular ring having a bore and presenting a gap of a size to accommodate the passage of the rim and tire of a bicycle therethrough,
    b. an arcuate rod slideable in said bore to be interposed between the spokes of a wheel and presenting a gap of an extent greater than the gap in said ring,
    c. an arcuate slot in said ring having an extent substantially the same as the gap in said rod, said slot having closed ends,
    d. a stem extending through said slot, having an inner end anchored to the rod and a tab on its outer end, e. said ring being formed with two pairs of aligned apertures which are angularly spaced apart a distance substantially equal to the angular extent of said arcuate rod, f. a transverse bracket spanning said ring and cooperating therewith to define an upper closed ring section and a lower open ring section including the gap in the ring, g. a metallic line having one end permanently secured to said closed ring section and a loop at the other end which in a locked position of the ring, receives a part of the open section of the ring or that part of the rod which closes the gap, and h. a padlock including a hasp which is adapted to be passed through either of said pair of aligned apertures to secure the ring in an adjusted position said hasp also being adapted to receive said loop at the end of said line.

2. The bicycle lock of claim 1 in which one of said pair of apertures is located closely adjacent to one side of the gap in the ring and between the closed end of the slot and said gap with the other pair of aligned apertures being spaced from the other side of the gap in the ring a distance equal to the extent of the gap in the rod.

3. The bicycle lock of claim 1 in which the metallic line is a wire cable having a loop at each end with the permanent connection to the closed ring section being established by one of said loops receiving the closed ring section.

4. The bicycle lock of claim 1 in which the bracket comprises a cross bar and a tiebar having confronting concave portions which receive arms of a bicycle frame together with a bolt and nut for clamping said bars together with the frame arms therebetween.

5. The bicycle lock of claim 1 which is intended for application to the front wheel of a bicycle including wheel brakes which are operated by control levers on the handlebars with the brake for the front wheel including a center bolt which mounts the brake on the bicycle frame and the bracket comprising a cross bar having a center opening receiving said bolt and concaved portions receiving frame arms of the bicycle.

6. The bicycle lock of claim 1 in which the metallic line has an extent in the order of 6 feet.

* * * * *